United States Patent [19]

Kokkonen et al.

[11] Patent Number: 5,279,769
[45] Date of Patent: Jan. 18, 1994

[54] METHOD FOR PREPARING A CONDUCTIVE POLYMER

[75] Inventors: Timo Kokkonen, Sipoo; Toivo Kärnä, Porvoo; Jukka Laakso, Helsinki; Per Nyholm; Jan-Erik Österholm, both of Porvoo; Henrik Stubb, Espoo, all of Finland

[73] Assignee: Neste Oy, Finland

[21] Appl. No.: 777,396

[22] PCT Filed: Mar. 27, 1991

[86] PCT No.: PCT/FI91/00082
§ 371 Date: Jan. 30, 1992
§ 102(e) Date: Jan. 30, 1992

[87] PCT Pub. No.: WO91/15859
PCT Pub. Date: Oct. 17, 1991

[30] Foreign Application Priority Data

Mar. 30, 1990 [FI] Finland ................... 901632

[51] Int. Cl.$^5$ ............... H01B 13/00; C08L 65/00
[52] U.S. Cl. .................... 252/500; 252/518; 264/176.1; 264/211
[58] Field of Search ............... 252/500, 518; 264/176.1, 211

[56] References Cited

U.S. PATENT DOCUMENTS

| | | | |
|---|---|---|---|
| 4,568,482 | 2/1986 | Jenekhe et al. | 252/500 |
| 4,935,164 | 6/1990 | Wessling et al. | 252/500 |
| 5,110,669 | 5/1992 | Knobel et al. | 428/463 |
| 5,151,221 | 9/1992 | Österholm et al. | 252/500 |
| 5,171,478 | 12/1992 | Han | 252/500 |

FOREIGN PATENT DOCUMENTS 8901015  2/1989  World Int. Prop. O. .

Primary Examiner—Paul Lieberman
Assistant Examiner—Bradley A. Swope
Attorney, Agent, or Firm—Steinberg & Raskin

[57] ABSTRACT

The invention relates to a method for preparing a conductive polymer product by doping a conductor polymer. The conductor polymer or a mixture of the conductor polymer and a matrix polymer is in a molten state brought into contact with a doping agent, whereafter the mixture is treated into a product.

11 Claims, 2 Drawing Sheets

METHOD FOR PREPARING A CONDUCTIVE POLYMER

The invention relates to a method for preparing a conductive polymer by doping a conductor polymer.

Plastics and other polymers do not by themselves conduct electricity, but they can be made conductive for various applications. Electrically active or conductive polymers can be prepared from organic polymers having long chains of conjugated double bonds. The silicon electrodes in the double bonds can be "disturbed" by adding to the polymer certain doping agents, which either receive or donate electrons. Openings or extra electrons then arise in the polymer chain, which make the passage of electric current along the conjugated chain possible. The conductivity of polymers can be adjusted depending on the doping agent content such that it covers nearly the entire conductivity range from insulators to metals. Such conductive polymers have many interesting applications, e.g. in the manufacture of light batteries and accumulators.

Polythiophene is one of the polymers, which can be made electrically active in the above-mentioned manner. Polythiophene can be prepared for example by using Ziegier-type catalysts and acidic initiators.

The usability of electrically active polymers is dependent e.g. on their stability properties. Polythiophene is in a reduced pure form very stable in different conditions, such as in air, moisture, vacuum and at high temperatures. The stability of a conductive polythiophene is, by contrast, in different conditions dependent on the doping agent anion used. The polythiophene complexes known previously are more or less unstable and thereby questionable for many applications. According to an earlier patent application by the applicant, "A conductive polythiophene and a method for its preparation and its usage" (FI-852883), a more stable conductive polythiophene polymer is prepared by doping and treating it with $FeCl_3$. According to the application, this doping is performed by means of a solvent or a suspension medium. After the doping, the membrane obtained is washed clean from the extra doping agent.

After the doping, the polymer is generally insoluble and it can no longer be formed, due to which doping has traditionally been performed subsequently after the forming of the polymer.

As known, the doping of polymers thus occurs after the treatment, or after the formation of the product, e.g. in the manner described above with $FeCl_3$. Such a method becomes very expensive because of special devices designed for doping, and furthermore, it is unpractical and non-pro-environmental, since toxic volatile gases spread to the environment.

Prior art is also described in the U.S. Pat. No. 4,557,807 and EP patent application 0 168 621 A2, which present devices and methods for preparing conductor polymers by coating the polymer with a conductive coating, which is brought onto a pretreated polymer membrane placed in a form with an electrical layering method.

As previously mentioned, conductive polymers are polyconjugated systems. The properties of conductive polymers include a high crystallinity, and their color is generally mat-black. Conductive polymeric and organic conductors are generally speaking insoluble, it is not possible to melt or form them, and in certain cases, they are unstable against oxygen, moisture and high temperatures, due to which also doping at high temperatures has previously not succeeded. Until now, it has therefore not been possible to treat or form conductor polymers thermoplastically in any way. There are descriptions of the meltability of some single conductor polymers, but their conductivity has been very poor.

Methods have been presented, in which gel-like polymer mixtures containing a solvent are pressed and dried and thereafter calendered. However, the final product still contains an amount of the solvent, see e.g. EP-26235 and GB-2072197.

For solving the problem, attempts have also been made to develop special polymerization methods, and mixtures of conductor polymers and other polymers have been formed, which could be formed after doping. The conductivity has, however, generally been too low. Suspensions have also been formed, which contain a solvent suitable for moisturization.

With respect to prior art related to this invention, a reference is made to the EP patent application no. 0,168,620, in which the object is to achieve a stable dispersion of a conductor polymer into a thermoplastic polymer, the forming of which is possible such that an optimal conductivity is maintained. Another object of this publication is also the possibility of stabilization after the dispersion. In this EP publication, the conductor polymer is mixed (dispersed or dissolved) in a molten state with a thermoplastic polymer, until a homogenous mass is obtained, after which the solvent is removed. Polyether, polyester, polyvinylidene chloride, polyamide, etc. have been mentioned as the matrix polymer. The doping according to the publication occurs in a solution or by the action of ultrasound. Additives are also used for improving the treatability.

The object of the present invention is to provide a method for doping a conductor polymer, in which method the properties of the conductor polymer can be treated as desired, and which polymer is stable. Furthermore, the object of the present invention is to provide a method, in which no disadvantages of prior art occur.

In this application, the concept "conductor polymer" also concerns the polymer to be doped, although it is not yet conductive before the doping.

For reaching the above goals, the inventive method for preparing a conductive polymer product by doping is mainly characterized in that a conductor polymer or a mixture of a conductor polymer and matrix polymer is in a molten state brought into contact with a doping agent, after which the mixture is treated into a product in a manner known per se.

The preferred embodiments of the invention have the characteristics of the subclaims.

The applicants have discovered that the doping can be performed by adding a doping agent into a conductor polymer when it is in a molten state, and the doping is timed to occur in connection with the treatment. This means that the doping is performed when treating the product e.g. in connection with injection moulding, whereby the doping agent is added to an extruder or after it, before being pressed into a form.

Previously, when attempts have been made at a high temperature, it has only been observed that the dopability deteriorates. In this invention, this is utilized such that the dopability deteriorates temporarily, whereby the doping and the treatment occur essentially simultaneously.

In accordance with the invention, the doping agent can be brought to the molten mixture such that is has been mixed with the conductor polymer or the matrix plastic, or the doping agent can be added directly to the conductor polymer or to the molten mixture formed by the conductor polymer and the matrix plastic. In this case, the mixing of the doping agent with the plastic occurs e.g. in an extruder before the passsing of the product, whereby the doping action begins in connection with the melt mixing and continues during the forming of the product and after it.

In compliance with the principle of the invention, the doping can be performed in connection with any melt treatment method for plastics. Such methods include extrusion, calendering, deep drawing, coating and injection moulding, press moulding, membrabe blowing, etc.

The oxidizing and reducing doping agent can be a gas, (e.g. an iodine steam), a liquid (e.g. a liquid sulphonic acid) or a solid substance (e.g. a sulphonic acid having a suitable melting point).

The polymer used can be any melt-treatable dopable polymer, such as poly(3-octyl thiophene), and the matrix material can be any treatable polymer.

The invention can be used for preparing any polymer having a potential conductivity.

An example of an embodiment of the invention is described next with reference to the figures of the accompanying drawing. This is not intended to limit the invention, but it is shown to illustrate the invention, since the invention can be applied in connection with any melt treatment method.

FIG. 1 is a section of the inventive device, when the parts of the device have been separated.

FIG. 2 shows the first mixing step.

Figure 1:
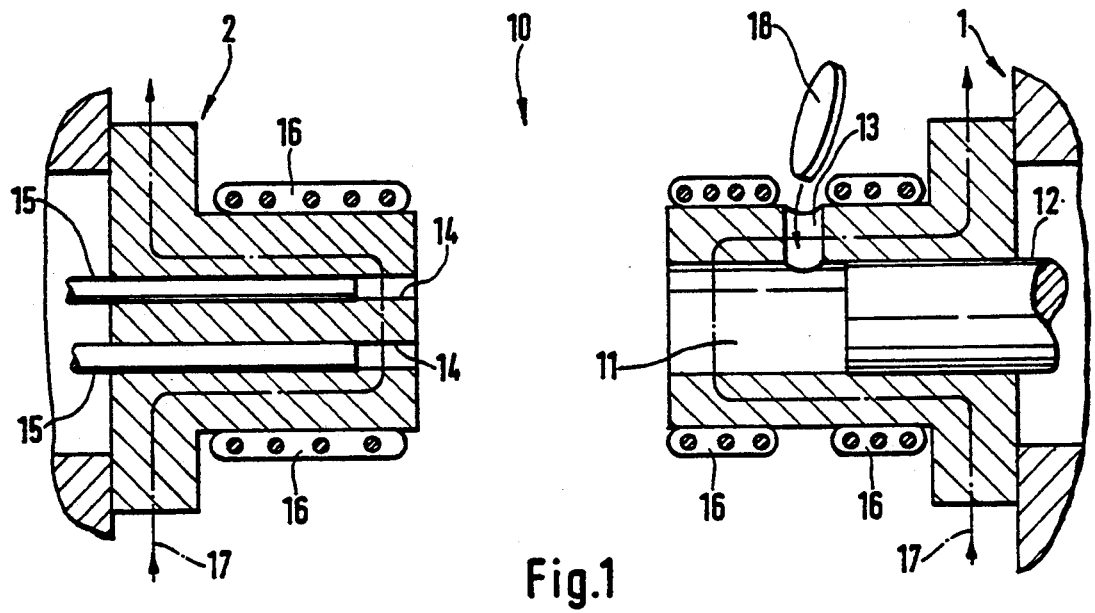
FIGS. 1 and 2 show one embodiment of how the inventive doping can be performed when treating the polymer e.g. by means of a mixer according to the FI application 896313.

FIG. 1 shows a mixing device 10, when its main parts, a mixing cylinder 1 and a bottom part 2, are separated. The mixing cylinder 1 has a cylindrical mixing space 11, into which a mixing piston 12 is fitted. The mixing piston 12 can move in the cylindrical mixing space 11, whereby the size of the mixing space varies. The mixing piston 12 can also be rotated. The mixing cylinder 1 can also have an opening 13 for adding a raw material 18 to be mixed, i.e. a conductor polymer and a possible doping agent and a matrix polymer. With respect to a more detailed description of this device, a reference is made to the applicant's FI patent application no. 896313.

In one modification of the device, the mixing piston or auxiliary pistons are used for removing a completely mixed material from the mixing device. In this case, the mixing device operates as a conventional injection moulding machine with a fixed mould, whereby the doping and the press moulding of the conductor polymer is achieved in the same device. In the invention, the doping agent can also be added to the mould and the mixing device is emptied at the same time as the plastic mixture is led directly into the mould, in which case the forming of the product occurs as the final step of the mixing. The embodiment of the inventive mixing device is also provided with heating and, when needed, with cooling.

The function of the inventive mixing device is illustrated in the enclosed drawings.

The bottom part 2 is provided with one or several auxiliary cylinders 14 provided with auxiliary pistons 15. The auxiliary pistons 15 can move in the auxiliary cylinders 14 such that the volume of the auxiliary cylinders 14 varies according to the movement of the auxiliary pistons 15. The auxiliary pistons 15 may be provided with their own actuators for moving them, or they may only have a return spring.

Both main parts 1 and 2 of the mixing device 10 are provided with heating devices for heating and melting the material to be mixed, which devices are most preferably electric resistances 16. Similarly, the device can be provided with cooling, which most preferably comprises a piping 17 for coolant circulation.

FIG. 1 shows at the same time a mixing step, wherein a raw material 18 to be mixed is added to the mixing device 10. The main parts 1 and 2 of the mixing device 10 are then usually in a closed space. In the invention, the material to be mixed is thus a conductor polymer or a mixture of a conductor polymer and a matrix polymer and often in this phase already a doping agent.

Figure 2:
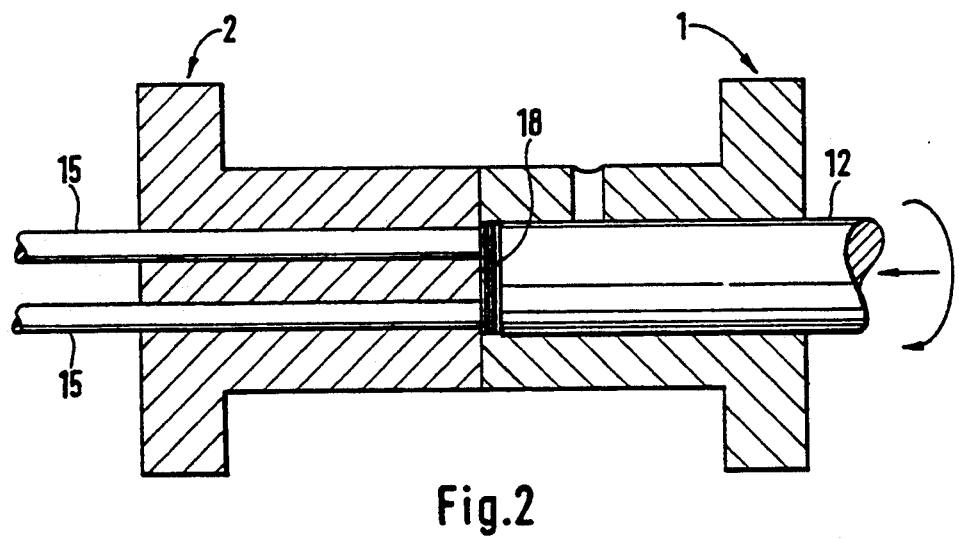

In the first mixing step of FIG. 2, the material 18 to be mixed, which is thus a conductor polymer or a mixture of a conductor polymer and a matrix polymer and as well as a doping agent, is entirely in the mixing space 11. The mixing in the first step occurs by rotating the mixing piston 12. If the materials 18 are solid, their melting by the electric resistances 16 occurs in the first step.

Figure 3:
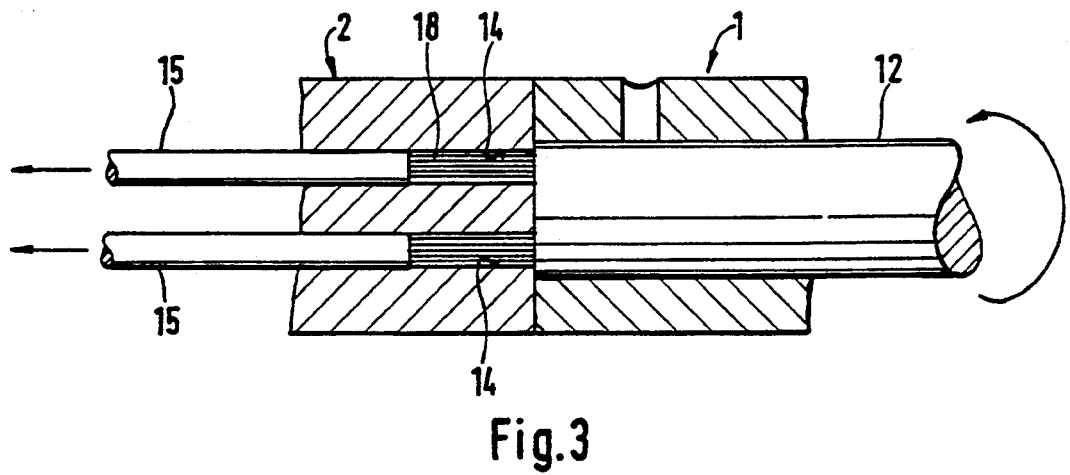
FIG. 3 shows the second mixing step.

FIG. 3 shows the second mixing step, in which the material 18 to be mixed is pressed into the auxiliary cylinders 18 by means of the main cylinder. This occurs by pushing the mixing piston 12 into the mixing space 11. The auxiliary pistons 15 in the auxiliary cylinders 14 then push deeper into the auxiliary cylinders 14 and the material 18 to be mixed can enter inside the auxiliary cylinders 14.

Figure 4:
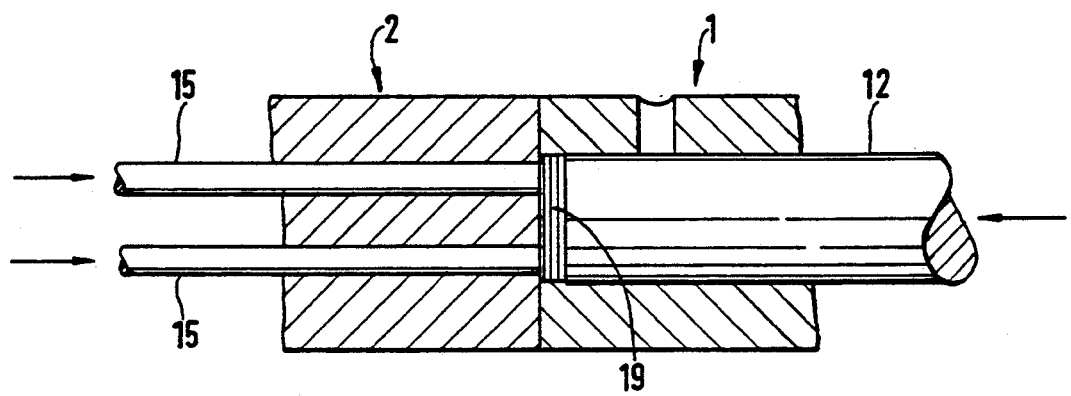
FIG. 4 shows the cooling step.

FIG. 4 shows a possible cooling step. When the mixing steps shown in FIG. 2 and 3 have been repeated a sufficient number of times, the mixed product 19 can be cooled by leading a coolant into the cooling channel 17. The mixed product is then directly led e.g. into a mould or into another forming treatment, whereby the forming of the product occurs as a final step of the mixing. The mixed product 19 can then be cooled under pressure, which thereby prevents the segregation of gases in the plastic.

Figure 5:
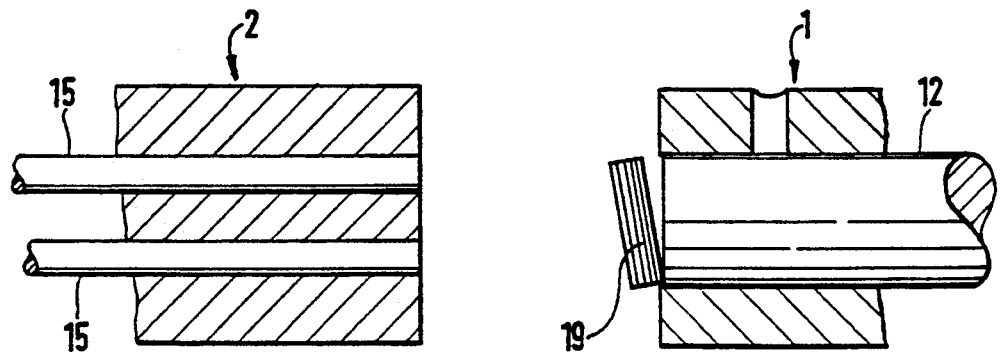
FIG. 5 shows the removal step of a test piece.

FIG. 5 shows the removal step of the test piece. The cooled, mixed product 19 is removed from the forming treatment occurring after the mixing device 10 by separating the main parts of the mixing device 10, i.e. the mixing cylinder 1 and the bottom part 2, from each other.

In one embodiment of the mixing device 10, the material 18 to be mixed is added as solid, e.g. as granules, which are melted by means of heating devices, preferably e.g. by means of electric resistances 16, placed in the mixing device 10. The mixing device 10 can also be realized without the opening 13 shown in FIG. 1. The material 18 to be mixed (the conductor polymer) and the doping agent or the polymer mixture and the doping agent is then added to the mixing space 11, when the bottom part 2 and the mixing cylinder 1 are separated.

Similarly, the mixing device 10 is can be furnished with a cooling device, comprising e.g. channels 17 surrounding the mixing space 11 for coolant circulation. It is most preferable to use water as a coolant.

There are several alternatives to return the auxiliary pistons 15 in the auxiliary cylinders 14. The movements and the returning of the auxiliary pistons 15 can be controlled in a hydraulic way. Another possibility is to provide the auxiliary pistons 15 of the auxiliary cylinders 14 with a pull-back spring, where at the auxiliary cylinders 14 is emptied with the movements of the mixing piston 12.

Advantages of the invention are that it has extensive possibilities of application, since it can be used for preparing all conductive antistatic and EMI protective materials, e.g. for EMI applications (ADP monitor) (EMI=electromagnetic interference) or ESD applications (antistatic mat), whereby the composition is for example 1) PP+POT (polypropylene+polyoctyl thiophene)
2) hard PVC+POT (polyvinyl chloride+polyoctyl thiophene)
3) soft PVC+POT (polyvinyl chloride+polyoctyl thiophene)
4) PS+POT (polystyrene+polyoctyl thiophene)
5) PE+POT (polyethylene+polyoctyl thiophene)
6) EVA+POT (ethylene vinyl acrylate+polyoctyl thiophene)
7) ABS+PVC+POT (acrylonitrile butadiene styrene+polyvinyl chloride+polyoctyl thiophene)

Furthermore, the invention is illustrated by means of the following example.

EXAMPLE 4.42 g of poly(3-octyl thiophene) is placed in the mixer, as a doping agent is used 2.21 g of iodine and 1.36 g of polyethylene. The mixing time is 20 s, the pressing time 20 s and the cooling time in the mould is 120 s. The conductivity of the test piece obtained is $10^{-4}$ S/cm.

The patent claims are presented next, within the scope of whose inventive idea the details of the invention can vary.

We claim:

1. A method for preparing an electrically conductive polymer product by doping a conductor polymer, comprising the steps of
   preparing a conductor polymer, or a mixture of the conductor polymer and a matrix polymer, in a molten state,
   introducing a doping agent into the polymerized conductor polymer when in said molten state, and thereafter
   forming the mixture into a finished product of a conductive polymer.

2. A method according to claim 1, characterized in that the doping agent is an oxidative or reductible gas, a liquid or a solid substance.

3. A method according to claim 1, wherein the conductor polymer is prepared by melting until the conductor polymer attains the molten state, the method further comprising the step of
   adding the doping agent to the conductor polymer, or to the mixture of the conductor polymer and the matrix polymer, at the same time the conductor polymer is melted.

4. A method according to claim 1 further comprising the step of
   adjusting the conductivity of the polymer by regulating the quantity of the doping agent or the conductor polymer.

5. A method according to claim 1, characterized in that the forming method used is selected from the group consisting of extrusion, calendering, deep drawing, coating and injection moulding.

6. A method according to claim 1, wherein the doping agent is selected from the group consisting of iodine, sulfonic acid and ferric chloride.

7. A method for preparing an electrically conductive polymer product by doping a conductor polymer, comprising the steps of:
   placing a substrate comprising a conductor polymer, or a mixture of a conductor polymer and a matrix polymer, into a mixing device,
   introducing a doping agent into the substrate in the mixing device,
   mixing the substrate in the mixing device,
   heating the substrate in the mixing device until said substrate reaches a molten state, and
   cooling the substrate such that a finished product of a conductive polymer is thereby formed from a conductor polymer whereby the doping action begins in connection with the melt mixing and continues during the formation of the finished product.

8. A method as claimed in claim 7, wherein the substrate is mixed and heated in the mixing device simultaneously.

9. A method as claimed in claim 7, wherein the mixed material is cooled by leading a coolant material into a cooling channel arranged in the mixing device.

10. A method as claimed in claim 7, further comprising the step of directing the finished product of a conductive polymer through a forming treatment.

11. A method as claimed in claim 7, further comprising the step of adjusting the conductivity of the finish product of conductive polymer by regulating the quantity of the doping agent and/or the conductor polymer in the raw material.

* * * * *